US008423363B2

(12) United States Patent
Gupta et al.

(10) Patent No.: US 8,423,363 B2
(45) Date of Patent: Apr. 16, 2013

(54) IDENTIFYING KEYWORD OCCURRENCES IN AUDIO DATA

(75) Inventors: Vishwa Nath Gupta, Brossard (CA); Gilles Boulianne, Saint-Pie (CA)

(73) Assignee: CRIM (Centre de Recherche Informatique de Montréal), Montréal, Québec (CA)

( * ) Notice: Subject to any disclaimer, the term of this patent is extended or adjusted under 35 U.S.C. 154(b) by 310 days.

(21) Appl. No.: 12/686,892

(22) Filed: Jan. 13, 2010

(65) Prior Publication Data

US 2010/0179811 A1  Jul. 15, 2010

Related U.S. Application Data

(60) Provisional application No. 61/144,243, filed on Jan. 13, 2009.

(51) Int. Cl.
| | |
|---|---|
| *G10L 15/28* | (2006.01) |
| *G10L 15/00* | (2006.01) |
| *G10L 15/18* | (2006.01) |

(52) U.S. Cl.
USPC ............ 704/255; 704/231; 704/251; 704/257

(58) Field of Classification Search .................. 704/231, 704/235, 251, 257, 270, 270.1
See application file for complete search history.

(56) References Cited

U.S. PATENT DOCUMENTS

| | | | | |
|---|---|---|---|---|
| 6,535,850 | B1 * | 3/2003 | Bayya ............................ | 704/239 |
| 6,662,180 | B1 * | 12/2003 | Aref et al. .............................. | 1/1 |
| 6,873,993 | B2 * | 3/2005 | Charlesworth et al. ....... | 707/740 |
| 7,904,296 | B2 * | 3/2011 | Morris ........................... | 704/254 |
| 7,983,915 | B2 * | 7/2011 | Knight et al. .................. | 704/254 |
| 2005/0010411 | A1 * | 1/2005 | Rigazio et al. ................. | 704/246 |
| 2007/0233487 | A1 * | 10/2007 | Cohen et al. ................... | 704/255 |
| 2009/0055185 | A1 * | 2/2009 | Nakade et al. ................. | 704/257 |

OTHER PUBLICATIONS

Weintraub et al. "LVCSR log-likelihood ratio scoring for keyword spotting". In proc. ICASSP, pp. 129-132, 1995.*
Chaudhari, Upendra V. et al., "Improvements in Phone Based Search Via Constrained Match With High Order Confusion Estimates", IBM TJ. Watson Research Center, Yorktown Heights, NY, U.S.A., © 2007 IEEE, ASRU 2007, pp. 665-670.
Gales, M.J.F., "Maximum Likelihood Linear Transformations for HMM-Based Speech Recognition", CUED/F-INFENGITR 291, Cambridge, United Kingdom, May 1997, 20 pages.

(Continued)

*Primary Examiner* — Jesse Pullias
(74) *Attorney, Agent, or Firm* — Wilmer Cutler Pickering Hale and Dorr LLP

(57) ABSTRACT

Occurrences of one or more keywords in audio data are identified using a speech recognizer employing a language model to derive a transcript of the keywords. The transcript is converted into a phoneme sequence. The phonemes of the phoneme sequence are mapped to the audio data to derive a time-aligned phoneme sequence that is searched for occurrences of keyword phoneme sequences corresponding to the phonemes of the keywords. Searching includes computing a confusion matrix. The language model used by the speech recognizer is adapted to keywords by increasing the likelihoods of the keywords in the language model. For each potential occurrences keywords detected, a corresponding subset of the audio data may be played back to an operator to confirm whether the potential occurrences correspond to actual occurrences of the keywords.

21 Claims, 8 Drawing Sheets

OTHER PUBLICATIONS

Gupta, Vishwa et al., "Multiple Feature Combination to Improve Speaker Diarization of Telephone Conversation", Centre de Recherche Informatique de Montreal (CRIM), Montreal, Canada, © 2007 IEEE, ASRU 2007, pp. 705-710.

Ramabhadran, B. et al., "The IBM 2006 Speech Transcription System for European Parliamentary Speeches", *TC-STAR Workshop an Speech-to-Speech Translation*, Jun. 19-21, 2006 Barcelona, Spain, IBM TJ. Watson Research Center, Yorktown Heights, NY, U.S.A., pp. 111-116.

Miller, David R. H. et al.., "Rapid and Accurate Spoken Term Detection", BBN Technologies, Cambridge, MA, U.S.A., *Interspeech 2007*, Aug. 27-31, Antwerp, Belgium, pp. 314-317.

Chen, Stanley F. et al., "Advances in Speech Transcription at 1MB Under the Darpa EARS Program", IEEE Transactions on Audio, *Speech, and Language Processing*, vol. 14, No. 5, Sep. 2006, pp. 1596-1608.

Vergyri, Dimitra et al., "The *SRI/OGI* 2006 Spoken Tenn Detection System", *SRI* International, Menlo Park CA, OGI School of Science & Engineering, OR, *Interspeech 2007*, pp. 2393-2396.

Gupta, Vishwa et al., "Combining Gaussianized/non-Gaussianized Features to Improve Speaker Diarization of Telephone Conversations", *IEEE Signal Processing Letters*, Dec. 2007. 4 pages.

Rose, Richard et al., "Subword-Based Spoken Term Detection in Audio Course Lecture", Department of ECE, McGill University, Montreal, Canada, Centre de Recherche Informatique de Montreal, Montreal, Canada, Brno University of Technology, Brno, Czech Republic, Mar. 2010. 4 pages.

* cited by examiner

IDENTIFYING KEYWORD OCCURRENCES IN AUDIO DATA

CROSS-REFERENCE TO RELATED APPLICATIONS

This application claims priority to U.S. Provisional Application No. 61/144,243, which was filed on Jan. 13, 2009, the contents of which are incorporated herein by reference in their entirety.

FIELD OF THE INVENTION

The present invention relates to audio data processing and more particularly to audio data searching and more particularly to searching for occurrences of keywords in audio data.

BACKGROUND OF THE INVENTION

There are many instances where it is necessary to detect recordings comprising occurrences of uttered keywords. Oftentimes, it is possible to identify recordings pertaining to a particular topic on the basis of the presence or absence of certain keywords in the recordings.

Audio quality in recorded telephone conversation is often less than ideal. Recorded call may be sampled at a low sampling rate, a low bit rate and may be compressed. In part for this reason, an effective automatic detection of certain types of calls has not been developed until now.

In many businesses where telephone interactions play a large role, telephone calls are recorded and stored such that they can be recalled at a later date if necessary. This is useful if the later need is to access a single, identified call record, however if it becomes necessary to identify or access call recordings on the bases of their conversation contents, an operator must listen to all the recorded calls and manually select the pertinent ones.

The need to identify from among a plurality of recording those containing certain keywords can arise in many contexts. For example, telephone transaction or phone calls related to transactions take place in the context of trading, such as in energy trading. In energy trading, like in other trading contexts, regulating authority may investigate certain matters and require industry players to produce their recordings related to certain transactions. This may involve producing telephone recordings pertaining to a certain topic. Currently, doing so requires the manual scanning of hours of recording by human operators. This can be an extremely wasteful use of resources and can result in very costly investigations, particularly when there are a lot of recordings to search from.

In the context of national security as well, there may be a need to scan hundreds and even thousands of hours of recording to identify calls pertaining to certain topic. Identification of calls pertaining to topics of interest may be done on the basis of the presence of keywords in the call. In the context of security in general, audio information of interest may be from sources other than telephone calls such as from the audio component of a security camera output or from security microphones.

In addition to searching through stored recordings, it is often necessary to search through live audio streams in real-time or near-real-time. For example in the context of corporate security, it may be desired to identify any telephone call in which confidential information is being discussed in real-time so that inadvertent or deliberate leaks may be prevented as they occur. Likewise in the context of national security, calls pertaining to very high-risk individuals or to present events may require an immediate security reaction.

In the context of the above, it can be appreciated that there is a need in the industry for a means of reducing the burden of identifying keywords occurrences in audio data.

SUMMARY OF THE INVENTION

In accordance with a first broad aspect, the present invention relates to a method for processing audio data conveying speech information. The method comprises providing a computer based processing entity having an input, the processing entity being programmed with software to perform speech recognition on the audio data. The method further comprises providing at the input a signal indicative of at least one keyword. The method further comprises performing speech recognition on the audio data with the processing entity to determine if the audio data contains one or more potential occurrences of the keyword. The method further comprises, when the performing identifies a potential occurrence of a keyword in the audio data, generating location data indicative of a location of a spoken utterance in the audio data corresponding to the potential occurrence. The method further comprises processing the location data with the processing entity to select a subset of audio data from the audio data for playing to an operator, the subset containing at least a portion of the spoken utterance corresponding to the potential occurrence. The method further comprises playing the selected subset of audio data to the operator. The method further comprises receiving at the input verification data from the operator confirming that the selected subset of audio data contains the keyword or indicating that the selected subset of audio data does not contain the keyword. The method further comprises processing the verification data with the processing entity to generate a label indicating whether or not the audio data contains the keyword. The method further comprises storing the label in a machine readable storage medium.

In accordance with a second broad aspect, the present invention relates to a method of identifying occurrences of a keyword within audio data. The method comprises providing a computer based processing entity programmed with software, the software implementing a language model to perform speech recognition. The method further comprises inputting in the processing entity data conveying the keyword. The method further comprises processing the data conveying the keyword with the software to adapt the language model to the keyword and generate an adapted language model. The method further comprises processing the audio data with the adapted language model to determine if the audio data contains the keyword. The method further comprises releasing result data at an output of the processing entity conveying results of the processing of the audio data with the adapted language model.

In accordance with a third broad aspect, the present invention relates to a method of identifying occurrences of keywords within audio recordings containing speech information. The method comprises providing a computer based processing entity programmed with software, the software implementing a language model to perform speech recognition. The method further comprises inputting in the processing entity first data conveying a first keyword. The method further comprises processing the first data with the software to adapt the language model to the first keyword and generate a language model adapted to the first keyword. The method further comprises processing a first set of recordings with the language model adapted to the first keyword to determine if the first set of recordings contains the first keyword. The method further comprises inputting in the processing entity second data conveying a second keyword. The method further comprises processing the second data with the software to adapt the language model to the second keyword and generate a language model adapted to the second keyword. The method further comprises processing a second set of recordings with the language model adapted to the second keyword to determine if the second set of recordings contains the second keyword. The method further comprises releasing data at the output of the processing entity conveying results of the processing of the first and second sets recordings with the language models adapted to the first and second keywords, respectively.

This and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1:
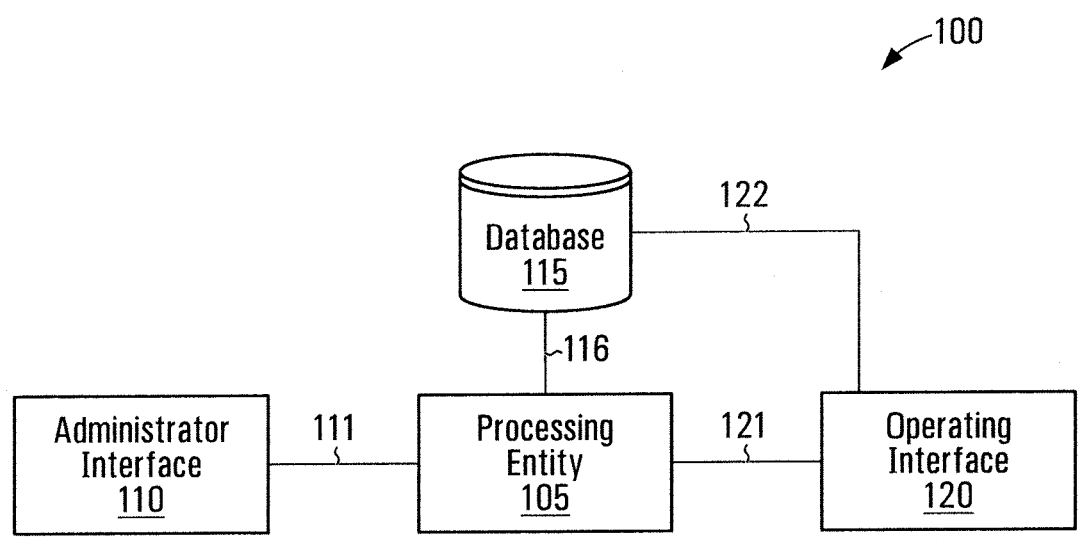
FIG. 1 shows a block diagram of a system for performing a keyword search in audio data according to a non-limiting embodiment.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF EMBODIMENTS

To facilitate the description, any reference numeral designating an element in one figure will designate the same or similar element used in any other figure. In describing the embodiments, specific terminology is used to for the sake of clarity but the invention is not intended to be limited to the specific terms so selected, and it is understood that each specific term comprises all equivalents.

FIG. 1 shows a system 100 for performing a keyword search in audio data comprising speech information such as an audio recording. The system 100 comprises a computer-based processing entity 105 and an administrator interface 110. The processing-entity 105 has an input to receive signals from the administrator interface 110 as will be described below. The system 100 may optionally include an operator interface 120, although this component may be part of the operator interface 110.

The processing entity 105 is computer-based and may comprise or be implemented using a single computer or distributed computing power over several computing entities. In general, the processing entity 105 is programmed with software for implementing the functionality described herein. A person skilled in the art will appreciate that there are many possible configurations for the processing entity 105 and the invention is not intended to be limited to any particular type of computing hardware nor by the specific implementation of the software that will provide the functionality described herein.

The processing entity 105 has access to audio data conveying speech information. In the example shown here, the processing entity 105 has access to a collection of audio recordings, shown here as being contained in a database 115. The recordings each comprise audio data and in the present example, the recordings each correspond to a telephone conversation that has taken place in the past and has been recorded and stored in the database 115. However, it should be understood that the recordings may represent other audio information in a different context. For example, recordings may represent the audio component of audiovisual recordings (such as the sound track of a television show or of a security camera tape), interview recordings, security microphone recordings, etc. . . . . Besides audio data, the recordings may also convey other data, such as metadata, timestamps, and other information.

In the example that will be used throughout, the audio data that is subject to a search will be described as audio recordings. It is to be understood however, that the audio data can take other forms. In particular, it will be appreciated that the processing entity 105 may perform the search on a continuous basis, and that it may be performed on a continuous input stream of data, provided that processing entity 105 is can perform the search fast enough or that it is endowed with a sufficient input buffer and/or audio data storage capability. Thus, it will be appreciated that although in the example given herein the audio data is provided in stored recordings, the audio data could also be received as streaming input, either directly from an audio source or from a remote storage location.

In order to perform a keyword search in audio recordings in the collection, the processing entity 105 is operative to access the recordings in the collection of recordings. In the present example, the collection of recordings 115 are stored in a database 115, which the processing entity 105 can access via data link 116. The processing entity 105 can retrieve and process recordings from the database as needed. The database 115 may be any suitable machine readable storage medium and may comprise several storage units, such as an array of disk drives or tapes. Although the database 115 is shown here as a single entity, it should be understood that the database 115 may be distributed. For example, call recordings may be stored on several computers across a network, which collectively form the database 115.

The data link 116 between the database 115 and the processing entity 105 may comprise any suitable communication medium. For example, if the database 115 is located at or proximate the processing entity 105, a known bus architecture may be used to embody the data link 116. Alternatively, the data link 116 may be a network link through which the processing entity 105 can access data on a network which comprises the collection of recordings.

The recordings in the collection of recordings may be stored in various formats without departing from the intended scope of the invention. For the purposes of the present description, it will be assumed that the recordings are digital files comprising a digitally sampled audio signal, such as a signal sampled at 8, 16, 32, 44.1, 48, or 96 KHz at 8, 16 or 32 bits per sample. These sample rates and bits per sample are examples for illustrative purposes only. The recordings may also be compressed. It should be understood that the recordings in the collection of recordings may be stored in analog format. If the recordings are stored in analog format, they are converted to digital form prior to processing by the processing entity 105, this may be done at the place of storage or by the processing entity 105 itself. In the latter case, since the recordings are being received at the processing entity 105 in analog format, the data link 116 is an analog data link such as a POTS telephone link.

Although shown in FIG. 1, it will be understood that the database 115 is optional and may be absent from certain embodiments. In particular, recordings may be received at the processing entity 105 in a stream. As will be described below, the keyword search may be performed in real time, thus permitting keyword searching of streaming audio recordings. In fact, the recordings may be recorded and stored only at the time of keyword searching by the processing entity 105.

For the purposes of the examples given in the present description, the recordings will be assumed to be recordings of telephone conversations comprising digitally sampled audio data and stored on a single database 115, however a person skilled in the art will appreciate that the system may be modified considerably without departing from the intended scope of the invention.

The general steps involved in an audio keyword search will now be described, with reference to FIG. 2.

Figure 2:
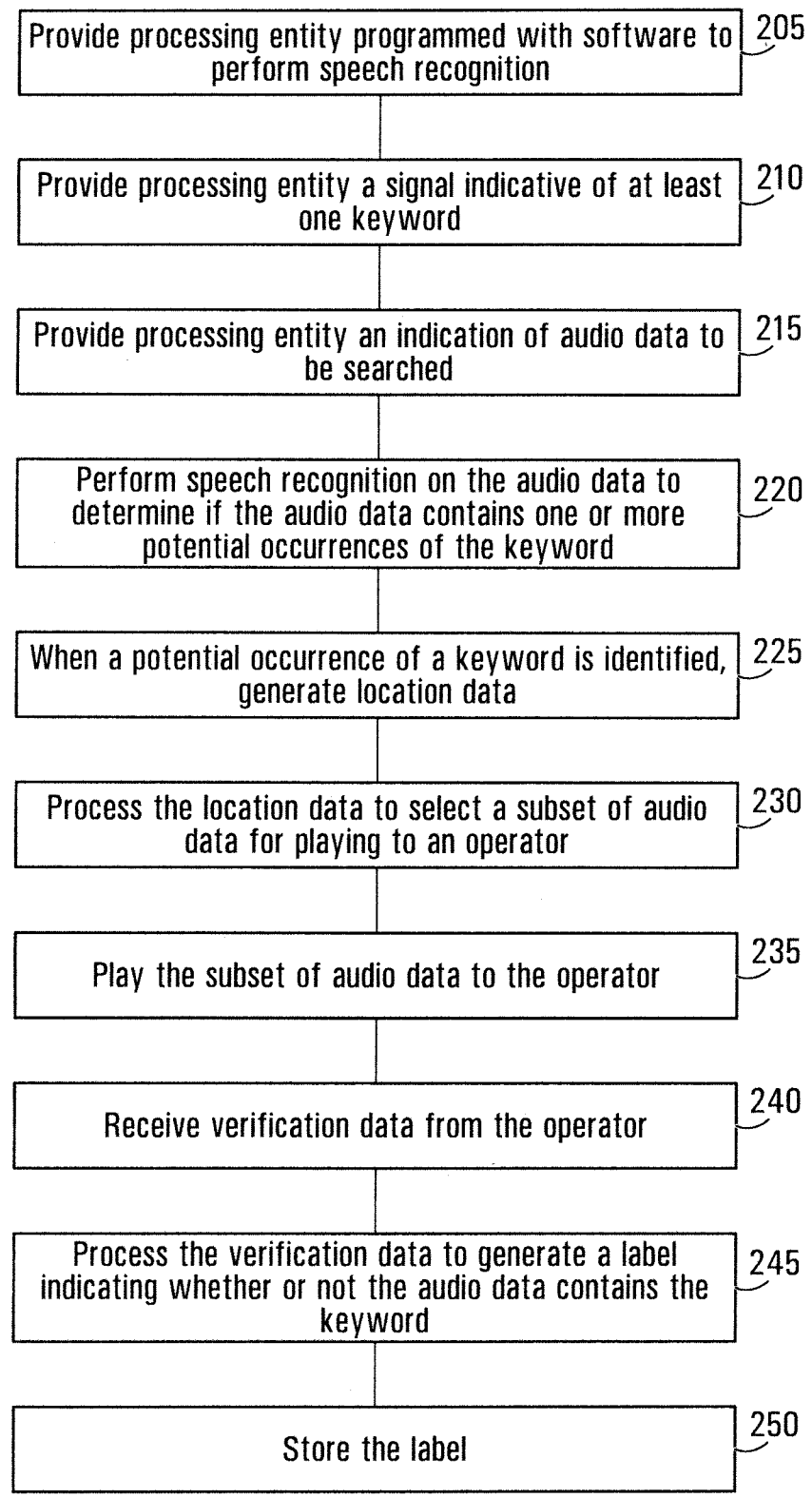
FIG. 2 shows a flow chart of a method for searching for keywords in audio data according to a non-limiting embodiment.

FIG. 2 illustrates the general steps involved in a method for searching for audio keywords in a plurality of recordings. At step 205, the processing entity 105 is provided. By provided, it is intended here that the processing entity 105 is dedicated to the purpose of the search, whether by specific action or instruction, or merely by virtue of being capable of undertaking the search.

At step 210, the processing entity 105 receives a signal indicative of at least one keyword. The at least one keyword will used as search terms. The signal indicative of the at least one keyword is received at the processing entity 105's input, from the administrator interface 110, which will be described in more details below, over the data link 111. Viewed from a different perspective, data conveying at least one keyword is input in the processing entity 105, for example from the administrator interface 110 via the data link 111.

For the purposes of the present example, it will be assumed that there are six keywords to be searched for, conveniently labeled here KW1, KW2, KW3, KW4, KW5, and KW6. It is to be understood that a single keyword, or any other number of keywords may be used. The keywords used may be selected based on their likelihood of being uttered in a recording of interest. It may be desired to select keywords that will be invariably or very likely uttered in a recording of interest. For example, if the search is concerned with identifying recorded conversations pertaining to a particular topic, there may be single keyword that would invariably be used in a conversation pertaining to the particular topic. Often, however, it may be the case that there is no one single keyword that is guaranteed to be uttered in a conversation pertaining to a particular topic. For this or other reasons, multiple keywords may be selected, each being for example related to the topic of interest such as to maximize the odds of all pertinent recordings being identified in the search.

Because it may not be possible to absolutely guarantee the detection of all occurrences of keywords in recordings, another reason to select multiple keywords would be to increase the likelihood of identifying a pertinent recording even if one uttered keyword contained therein is missed in the search.

It will be appreciated that where keywords may be uttered in recorded speech that is not of interest, each such keyword increases the potential for recordings that are not of interest to be uncovered. As such, selecting a keyword or keywords may require consideration the likelihood of the keyword or keywords to uncover relevant results and the likelihood of the keyword or keywords to uncover irrelevant results.

In this example, the keywords are representations of spoken terms. It should be understood that a keyword needs not necessarily be a single word. Nor does a keyword need to be a known word in a particular language. Indeed, keywords can be combinations of multiple words, acronyms, invented words, foreign words, numbers or any other speakable utterance.

At optional step 215 the processing entity 105 receives an indication of audio data to be searched. This may be done by any suitable means. In the present example, the indication of audio data to be searched identifies audio recordings. The database 115 may contain a very large collection of recordings, some of which may not be relevant to a particular search. For example, if the database 115 contains telephone conversation recordings for the past 5 years, but the user is only interested in searching telephone conversations having taken place in the last 3 months, it is preferable to avoid having to search through the entire collection of recordings since significant time and resources will be wasted searching the older recordings. As such, an administrator at the administrator interface 110 supplies parameters that define the scope of the search to be performed in the collection of recording. The parameters may include specific files names, such a list of files to search (where each file would be a specific recording), a range of dates or times during which the calls occurred, parties involved in the conversation (identified by the phone number or name of individual) and the location of the parties involved in the conversation, among others. While it is possible to define the scope of the search on the basis of a single parameter, the administrator interface 110 also supports search criteria based on a combination of parameters or parameter ranges. For example, a search may be defined in terms of a recordings that occurred within a certain date range and between two specific parties.

It is to be appreciated that in an embodiment where the audio data being searched is streamed to the processing entity 105 on a continuous basis, the identification of audio data to be searched may identify characteristics of a stream, or portion thereof, that characterize audio data that is to be searched. T It is to be understood that there may not be an identification of audio data to be searched. For example, if the entirety of the audio data available is to be searched, or if all of an incoming data stream is to be searched, it may not be necessary to specify an identification of audio data to be searched.

The processing entity 105 is operative to process one or more recording to identify therein occurrences of the keywords. The manner in which this is done will be described in more detail below. For the purposes of the present example, it will be assumed that a plurality of recordings to be searched. However, it will be appreciated that in alternate examples, only a single recording may be searched in the manner taught herein. For now, it should be understood that the processing entity 105 searches the recordings for occurrences of the keywords, and identifies potential occurrences of those keywords. This is performed at step 220. The processing entity performs speech recognition on the audio data, in this case on the recordings, to determine if the audio data contains one or more potential occurrences of the keywords. As the processing entity 105 searches for occurrences of the keywords in the recordings it generates a sub-list of the recordings that are likely to contain occurrences of the keywords, based on the detection of potential occurrences of the keywords.

When, at step 225, a potential occurrence of a keyword is identified, the processing entity 105 generates location data indicative of a location of a spoken utterance in the audio recording corresponding to the potential occurrence. The location data may be any information that would allow locating the spoken utterance within the recording. For example, the location data may be a chronological measurement from the start of the recording, a time at which the potential occurrence of the keyword was uttered, an indication of a data location (such as a memory address or more broadly a distance in bits from a reference point), or a measurement of a distance from the start of the recording (or any other reference point) given in terms of any other increments (such as the number of phonemes from the start of the recording).

At step 230, the processing entity 105 processes the location data to select a subset of the audio data for playing to an operator. Because the detection of keywords in the recordings is not a perfect process, it is useful to call upon human judgment to determine whether each potential occurrence of a keyword does indeed correspond to a spoken utterance of the keyword. To this end, for all the potential occurrences of a keyword in the recordings, the system has the capability to play back to an operator a subset of the audio data in which the occurrence is suspected to reside. The subset may be a contiguous segment of the audio data of a short duration, as will be described below. The subset is to be played back to an operator who either confirms that the potential occurrence of the keyword is indeed a spoken utterance of the keyword (true positive), or rejects it as a false alarm (false positive). The use of human operators allows the system to be tuned for high sensitivity to the keywords to minimize undetectable false negatives. The high sensitivity may lead to an increased number of false positives, but these can be safely rejected by humans, who generally can easily tell whether a potential occurrence of a keyword is a false alarm upon listening to the corresponding segment of the recording.

In this form of implementation, the system thus takes advantage of the acute detection abilities of the human ear while avoiding the burden and costs of having to listen through all the recordings to be searched. Note however, that the intervention of a human operator is not essential in all instances. Embodiments exists where the system may operate in a purely automated fashion without involving an operator.

More specifically, the subset of the audio data is selected based upon the location data of the potential occurrence of the keyword. The intension is that if the keyword does indeed occur as suspected, the subset of the audio data played back to the operator will include the keyword utterance. To this end, the subset of the audio data may be a segment selected to be at least as long as the time it takes to utter the keyword. For illustrative purposes, it will be assumed that the subsets are unbroken segments, although other subsets of audio data may be used.

The segments selected for playback may have a fixed length, such as two seconds, set in advance. In general, a segment may begin at the start of the potential occurrence of a keyword, or a shortly before, to make sure that the keyword utterance, if present, will be contained within the segment even if the actual chronological position of the keyword occurrence is slightly off. For the same reason, it may also be desired to select a length for the segments that is slightly longer than the time it takes to utter the keyword such that if a keyword utterance is detected shortly before or after the actual occurrence of the keyword, the playback segment is still likely to encompass the entire keyword utterance. Another advantage of playing back a short section of the recording before and after the potential occurrences of keywords is that a human operator listening to the segments may derive a bit of contextual information from the audio before and after the potential occurrence. This short section of the recording, which may have a duration in the range of several seconds to a fraction of a second before a keyword is heard may also help the operator detect the keyword more easily.

The length of playback segments may be hard-set, that is set to a certain length and location that cannot be changed by the administrator, or it may be adjustable by the administrator using the administrator interface 110 when setting the search parameters. To this end, the administrator interface, which may be a Graphical User Interface (GUI) may comprise an input for receiving from the administrator a length of segment the keywords searched. Optionally, a different length of segment may be set for each keyword such that the length of the segment played back to an operator will depend on the particular keyword that is suspected to be found. Alternatively still, the processing entity 105 may variably set the length of keyword at every detection based on certain parameters of the detection such as the length of the potential occurrence of a keyword, the quality of the recording, a characteristic of the recording such as background noise level, or a confidence of detection.

Of course, it is to be understood that a human operator may, depending on the keyword and the quality of audio, be able to confirm the occurrence of a keyword upon hearing only a portion of its occurrence, and the length of the segment played back is not intended to limit the invention.

A preliminary analysis of potential occurrence of keywords may be performed before the playback operation. For example, the processing entity 105 may prevent overlapping potential occurrences of keywords and eliminate certain potential occurrences to prevent overlap. Overlap may occur when a single keyword is detected multiple times in close proximity, as will be described more below, or for example when the end of a keyword resembles the beginning of another. Detecting overlapping potential occurrences of keywords may be done in any suitable manner. For example, for each recording, the processing entity 105 may first detect all potential occurrences of keywords and select corresponding subsets of the recording for each potential occurrence, then identify which subsets overlap chronologically. Alternatively, the processing entity 105 may do this in real time by comparing each detected potential occurrence of a keyword and compare its chronological position with that of the last detected potential occurrence and conclude, based on chronological proximity, whether they overlap.

If two potential occurrences of keywords are found to overlap, the processing entity 105 may discard one. The choice of which potential occurrence to discard may be arbitrary or may be based on the confidence of detection for each potential occurrence (keep only the highest). If variable-length segments are used, an alternative to discarding overlapping potential occurrences is to group together the overlapping potential occurrences into one and to select a segment length and chronological position that will encompass all the overlapping potential occurrences. Whether the processing entity 105 avoids overlap by discarding or grouping together potential occurrences, the processing entity 105 may only address overlapping potential occurrences of the same keyword, allowing overlapping potential occurrences of different keywords (potentially leading to overlapping segments of the recording to be played back nonconcurrently to an operator).

It will be appreciated that the manner of addressing overlapping potential occurrences of keywords described above may also be used to address potential occurrences of keywords that are within a certain minimum threshold of chronological proximity, though not necessarily overlapping, if desired.

Processing each recording yields a set of segments (which set may be empty) corresponding to potential occurrences of the keywords in the recording. Information on the selected segments may then be stored in order to allow the system 100 to playback the selected segments to an operator. For each selected segment, information identifying the portion of the respective recording to which the segment corresponds may be stored or the selected segment of the recording itself (that is, the audio data) may be stored. In either case, the objective is to be able to cause the selected segments to be played back to an operator.

Each subset of the audio data is played to an operator at the operator interface 120. This is represented by step 235. The operator interface 120 will be described in more details below. In general, the processing entity 105 receives from the operator interface 120 verification data from the operator confirming that the subset contains the keyword or an indication that the subset does not contain the keyword. A confirmation that the indicates that the operator has listened to the subset of the audio data that corresponds to the potential occurrence of the keyword and agrees that the subset comprises a spoken utterance of the keyword (true positive), while an indication that the subset does not contain the keyword indicates that the operator has listened to the subset of the recording that corresponds to the potential occurrence of the keyword and believes that the subset does not comprise a spoken utterance of the keyword (false positive).

Although the use of a human operator as described above does not facilitate the detection of false negatives (undetected keywords), it has been found experimentally that when searching for calls pertaining to a particular topic, recordings comprising many keyword occurrences are much more likely to be relevant than those containing only one or few occurrences of keywords. As such, even an imperfect detection rate may yield good results if high enough, since relevant recordings will likely have multiple occurrences of keywords, at least one of which is likely be detected. In one experimental example, it was found that if the search results were a 73.2% rate or detection of keywords yielded a rate of identification of relevant recordings of over 97%.

At step 245, the processing entity 105 processes the verification data to generate a label indicating whether or not the audio recording contains the key word. In one embodiment, the processing entity 105 registers all confirmed potential occurrences of keywords. Based on the confirmations and rejections received from the operator interface 120, the processing entity filters the sub-list of the recordings that are likely to contain occurrences of the keywords to remove the recordings that contain no confirmed potential occurrences of keywords. The resulting sub-list of confirmed recordings is stored by the processing entity 105. The processing entity 105 may also store in the sub list information on what key word where found to occur in each recording in the sub-list of confirmed recordings and how many times.

By storing recordings in a sub-list, a label corresponding to each confirmed recording is contained in the sub-list. It is to be understood that this is only an example of a label and that the label may be anything informational token that indicates that the audio recording contains a keyword. In a very simple example, a memory pointer that indicates a recording, for example by memory location, may be a label as intended herein if it is known either to be associated with a recording that contains a keyword or to be associated with a keyword that does not contain a keyword. The memory pointer may be known to be associated with a recording that does or does not contain a key word by virtue of its location or by virtue of information associated with another pointer or indicator indicating it. A label may also be far more complex than a pointer or sub-list entry. For example, a label may be an entire file describing the result of the search for a particular recording or for many recordings.

It is to be understood that although in the example provided here, a label is generated that indicates whether or not the audio data contains a keyword that has been confirmed by an operator, any of the steps of identifying location data, selecting a subset of the audio data and playing back the subset of audio data to an operator may be omitted, and that the label may instead indicate that the audio data contain (here a recording) contains a potential occurrence of a keyword as determined at step 220.

At step 250 the label is stored in a machine readable storage medium. As a person skilled in the art will appreciated, the means and manner of storing the label can be very varied depending on the nature of the label and the available storage resources. The label may be stored on a long-term storage medium such as a hard drive for long-term storage or it may be stored temporarily for example in order to transmit it elsewhere.

Returning to the sub-list of confirmed recordings, in a non-limiting example, any recording comprising at least one occurrence of at least one keyword will be retained as a confirmed recording and entered into the sub-list. As mentioned above, one purpose of providing multiple keywords may be to maximize the probability of a recording of interest to be indentified in the search. Thus, in many cases, it may be desired to store any recording comprising at least one occurrence of at least one keyword in order to maximize the chances of all pertinent recordings being stored. In such a case, the processing 105 can now output the sub-list of confirmed recordings found above.

Alternatively, the search criteria may be made more complex. For example, it may be required to identify recordings in which certain combinations of keywords were spoken. In an arbitrary example, a combination may be given as: (KW1 AND (KW2 OR KW3)) OR (KW5 OR KW6). This combination stipulates that either KW5 and KW6 must occur, or KW1 and any one of KW2 and KW3 must occur in order to satisfy the criterion. Such Boolean search criteria, however, may lower the reliability of the overall search if the probability of identifying keyword occurrences isn't high enough. As mentioned above, in one experimental example, it was found that if the search results were a 73.2% rate or detection. This was enough to obtain a rate of identification of relevant recordings of over 97%, since there was generally multiple instances of the keywords selected in pertinent recordings. However, this performance was achieved by selecting as a search result all recordings comprising a confirmed occurrence of one of the keywords searched. Applying a Boolean search criterion (other than a universal OR for all the keywords) may reduce the recall rate since the criterion may lead to the elimination of certain recordings from the search results Other criteria may include additional factors, other than keywords, such as length of the recording (e.g. less than 10 seconds=wrong number; discard), number of keywords per minute, employee engaged in the telephone call (or workstation from which the calls was placed) possibly in combination with certain keywords (KW1 or KW2 if the caller is Bob, KW3 and KW4 if the caller is Joe, and KW5 or KW6 if the called is Susanne). These criteria are listed only as illustrative examples; the skilled person will appreciate that any of a number of search criteria may be used, relating or not to the keywords occurrences identified by the keyword search.

A list of all the recordings satisfying the search criteria may be generated. The processing entity 105 can be configured to output any desired output as a result of the search. In one example, the processing entity merely provides an administrator at administrator interface 110 with the list of recordings that satisfy the search criteria. Of course, the processing entity 105 can also communicate the list to other entities, or provide other information such as the audio information in the listed recordings.

Figure 4:
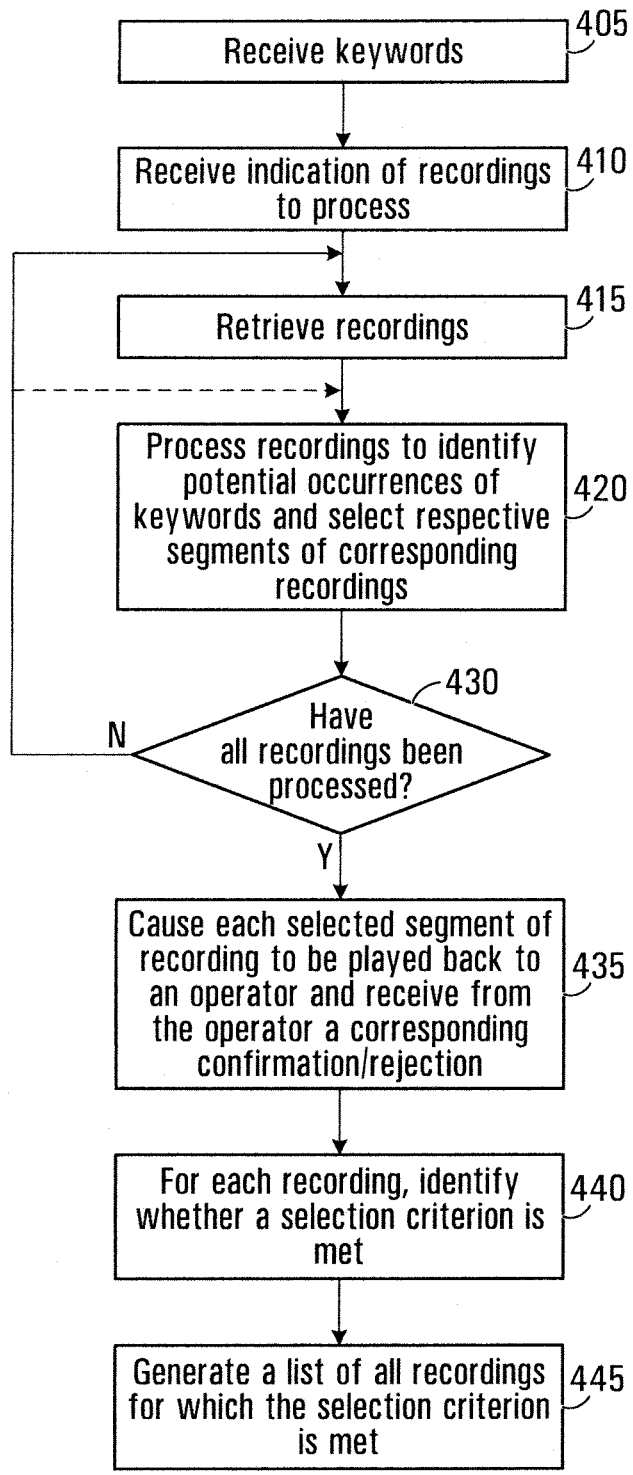
FIG. 4 shows a flow chart of a method for searching for keywords in audio data according to another non-limiting embodiment.

FIG. 4 shows a flow chart of an exemplary embodiment where recordings are searched for keywords. At step 405 keywords or an indication thereof are received. Optionally at step 410 an indication of recordings to process is received. The recordings to process may all be retrieved prior to searching for keywords (dashed line) but in the present example they are retrieved and searched one at a time. The first recording is retrieved at step 415. At step 420, the recording is processed to identify potential occurrences of keywords. Wherever potential occurrences of keywords are identified, respective subsets (here segments) of the recording are selected. At step 430, if there remains recordings to be searched, step 420 is repeated (as well as step 415 here since only one recording is retrieved at a time) until all recordings have been processed. At step 435, each selected segment of recording are played back to an operator. The operator sends verification data that is received at the processing entity 105. Step 435 may be performed in parallel with steps 415, 420 and 430. That is, playing back segments to an operator may begin as soon as a first segment is selected and must not necessarily wait until all recordings have been processed. Once verification data has been received for all the segments for a particular recording, the processing entity 105 identifies whether a selection criterion is met. Again, this needs not wait until all recordings have been processed. At step 445, a list of all the recordings for which a selection criterion is met is generated. Of course, labels other than list entries may be created for these recordings.

The operator interface 120 will now be described.

For the purposes of the present example, the system 100 will be described as having a single operator that is different from the administrator and that works at an operator interface 120. However, it should be appreciated that the operator may work from the administrator interface 110, in which case the functions of the operator interface 120 described herein will be integrated into the administrator interface 110. Likewise, it will be appreciated that the operator and the administrator may in fact be the same person.

The operator interface 120 is operative to playback selected segments of recordings and to receive from the operator an input indicative for each selected segment of a confirmation or a rejection of the potential occurrence of a keyword associated with the selected segment. To this end, the operator interface 120 is in communication with the processing entity 105 to receive therefrom the selected segments of recordings over the data link 121. Although shown in FIG. 1 as a separate entity from the processing entity 105, it should be understood that it is illustrated as so to facilitate conceptualization of the example, not to limit it. Indeed, the operator interface 120 may be located at, or be a part of, the processing entity 105, in which case the data link 121 may be embodied by any internal data sharing mechanism. Alternatively, the operator interface 120 may be embodied on a computer located away from the processing entity 105 and the data link 121 may be, for example, a network link.

Figure 3:
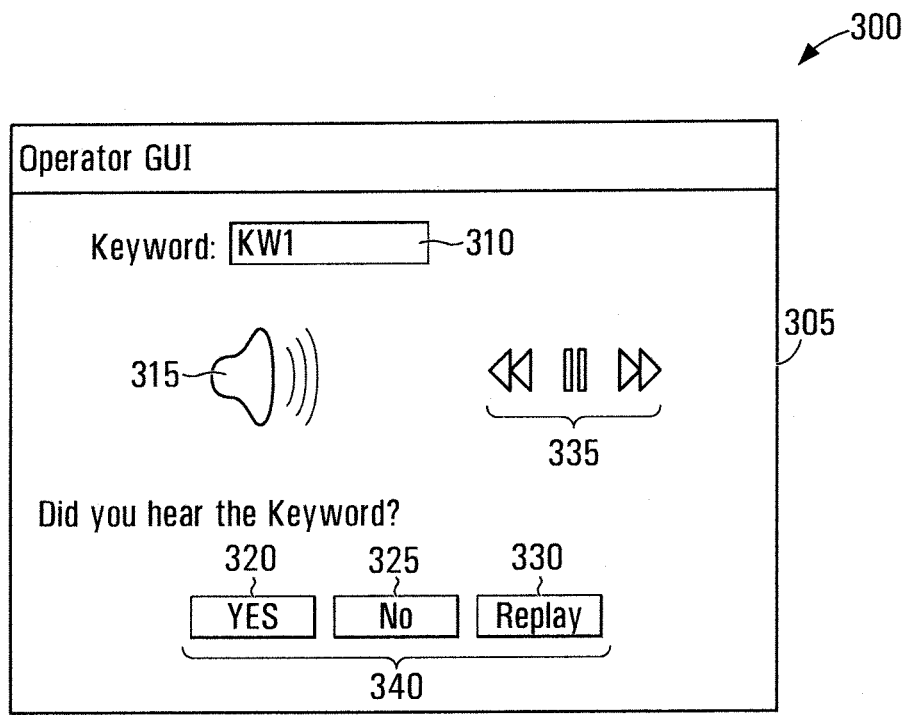
FIG. 3 shows an exemplary GUI for the operator interface of FIG. 1.

Whatever the exact configuration of the operator interface 120, the operator interface allows playback of selected segments of recordings to an operator. To this end, the operator interface 120 comprises an audio output mechanism for playing back segments to the operator. The operator interface 120 may also include a graphical user interlace (GUI) for interacting with the operator. FIG. 3 illustrates an exemplary GUI 300 for the operator interface 120. A pane 305 may be used to display information to the operator as well as to receive operator commands with pointing device, through touch screen inputs or keyboard. Some of the information displayed may help the operator identify whether a selected segment comprises an occurrence of a keyword or not. For example, a visual symbol 315 may indicate to the operator when a segment of recording is being played so that the operator can pay attention such that when a segment played back is faint or devoid of audio, the operator realizes he/she is in fact listening to a playback.

The GUI 300 may also display to the operator an indication of the keyword that is suspected to occur in the segment of the recording that is being played back. Here, the keyword itself ("KW1") is displayed textually at label 310 so that the operator may know/remember to listen for that particular keyword when listening to the played back segments. The system may additionally or alternatively play an audible sound clip of the key word prior to playing back the segment of the recording with the same objective as displaying the keyword.

In order to be able to receive input from the operator indicative of a confirmation or rejection of the keyword, an input controls 340 are provided. Here, the input controls takes the form of clickable control although a person skilled in the art will recognized that there many other mechanisms for receiving operator input may also be used. In the example shown, the operator is asked whether the keyword was heard in the played back segment to which the operator can answer "yes" by clicking on a yes button 320 to confirm the potential occurrence of the keyword, or the operator can answer "no" by clicking on a no button 325 to reject the potential occurrence of the keyword. In the particular example shown here, an additional "replay" button 330 is provided to permit the operator to cause the segment to be played back again, if the operator want to hear it a second time. A simple replay button 330 is useful when keywords are expected to be short, and the operator is not permitted to listen to parts of the recording outside of selected segments corresponding to potential occurrences of keywords. If the keywords are expected to be quite long, it may be desired to provide additional controls 335 to allow the operator to fast forward or rewind through the played back segment, or to pause playback. Also, the operator may be allowed to fast forward or rewind past the selected segment to listen to audio from the recording outside of the selected segment. Allowing this may be useful if the operator want to hear the context in which the conversation in the selected segment was spoken, but on the other hand, it provides the operator with the ability to listen to parts of conversations outside of the selected segments, which may have diminish the privacy and/or confidentiality of the system 100.

In order to play back selected segments of recordings, any suitable means for providing the audio data in the selected segments to the operator interface 120 may be employed. For example, the operator interface 120 may be provided with the selected segments themselves directly from the processing entity 105, or may be provided with an identification of the selected segments, and be trusted to retrieve the segments from the database 115. In the latter case, the operator interface 120 may have access to the database 115 via a data link 122.

It will be appreciated that, particularly if the operator is not provided the ability to listen to portions of the recordings outside the selected segments, the present system permits a high level of confidentiality and privacy to be maintained since typically, an operator would not listen to entire conversations but only to small segments of it. Furthermore, the acute accuracy of the human ear is relied upon in identifying occurrences of keywords while avoiding having to have entire conversations played back to human operators. Instead, only small selected segments of the recording where keywords are suspected to occur are played back, drastically reducing the overall playback time required, thus reducing with the time required to conduct the search. During experiments conducted, a test system was configured to generate around 3 false alarms per minute (or less than 4 keyword spots per minute) and the selected segments at every potential occurrence of keywords were set to 2 seconds in length, an operator only needed to listen to 8 seconds of speech for every minute of speech that would have had to be listened to if entire recordings were scanned by a human. This represents a time reduction by a factor of 7.5.

Although the present example was described with only one operator and operating interface 120, it will be appreciated that multiple operators and/or operating interfaces 120 may be employed. This may be useful if it is desired that multiple operators work in parallel or if it is desired that selected segments be each played back to more than one operator to make sure that their conclusions (confirm/reject) agree. Whether to allow parallel work, to provide redundancy or for whatever other reason, it will be appreciated that if multiple operators are present, the selected segments of recordings that are to be played back may be distributed to operators in any suitable manner.

The administrator interface 110 will now be described.

For the purposes of the present example, the system 100 will be described as having a single administrator that interfaces with a single administrator interface 110, although several administrators and/or administrator interfaces 110 may be present.

The administrator interface 110 is in communication with the processing entity 105 via a data link 111. It is to be understood that the administrator interface 110 may be separate from the processing entity 105, for example as a computer workstation connected by a network link, or may be integral with the processing entity 105, in which case the data link 111 is an internal one.

The administrator interface 110 allows an administrator to operate the system 100. In particular, the administrator interface 110 is operative to receive the keywords to be searched from an administrator and to transmit them to the processing entity 105.

The administrator interface 110 may be operative to receive keywords in text form. In order to perform the keyword search in the manner described below, the textual keywords are converted to respective phoneme sequences using a text-to-phoneme conversion system. In the present example, the conversion of keywords from text to phoneme sequence is performed at the administrator interface although it should be appreciated that the conversion may be performed at the processing entity 105 instead. The administrator interface 110 is operative to playback the pronunciations of the keywords corresponding to the phoneme sequences resulting from the text-to-phoneme conversion to the administrator. The administrator interface 110 thus allows the administrator not only to input the keywords but to listen to the automatically generated pronunciations. If necessary, the administrator may modify the pronunciations and concurrently the phoneme sequences corresponding to the keywords. There may be several possible pronunciations of a given keyword and the administrator interface 110 may allow an administrator to select several pronunciations for a given keyword, each of which will be transformed into a phoneme sequence and subsequently treated as a separate keyword. Once phoneme sequences for the keywords are derived, the administrator interface is operative to transmit these to the processing entity 105 via the link data link 111.

The administrator interface 110 may also allow the administrator to input search parameters. For example, the administrator may be able to specify which recordings from among the collection of recordings in the database 115 are to be searched, for example by identifying the individual recordings or by specifying criteria that the recordings require to be searched (such as a date range). Other search parameters may include a number or combination of keywords (and/or other factors) required for a recording to be retained in the search. The administrator interface 110 is also operative to transmit the search parameters received from the administrator to the processing entity 105.

The detection process of keywords in recordings will now be described.

In the present example the continuous speech recognition is performed by a continuous speech recognizer that employs a language model that has been adapted on the basis of the key words. The language model will be discussed in further details below.

Figure 7:
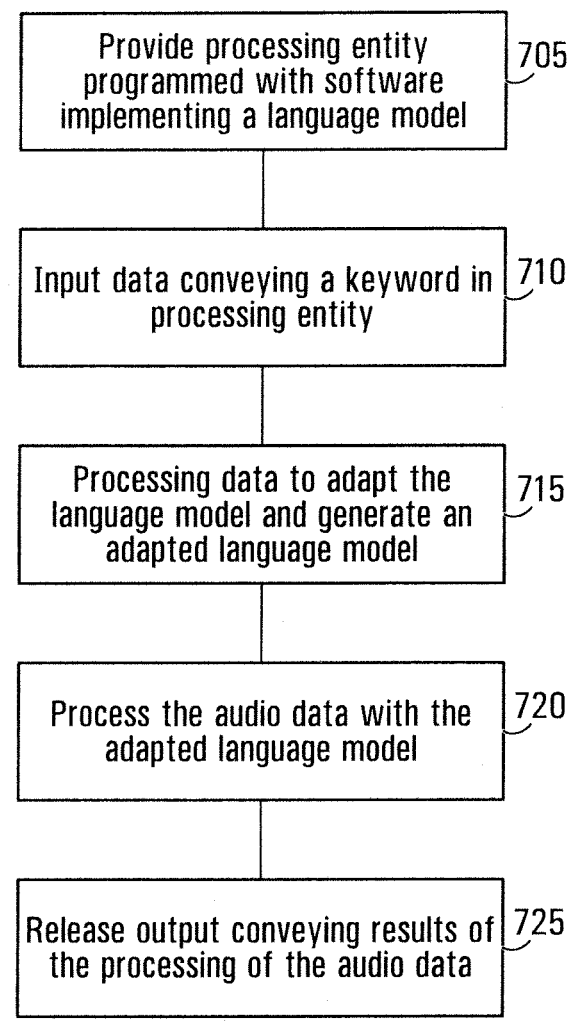
FIG. 7 shows a flow chart of a method for searching for keywords in audio data according to another non-limiting embodiment.

FIG. 7 illustrates broad steps of a method of identifying occurrences of keywords within audio data. The method will be described assuming that there are several keywords to be searched for, although one will appreciate that the method could be used as well to identify occurrences of a single keyword if there is only one keyword to be searched for. To begin with at step 705, the processing entity 105 is provided. The processing entity 105 may be programmed with software implementing a language model.

At step 710, data conveying the keywords are inputted into the processing entity 105. This can be done in any suitable manner, such as using an administrator at the administrator station 110 as described above.

At step 715, the software processes the data conveying the keywords to adapt the language model to the keywords and generate an adapted language model. As is known in the art, language models may be used in speech recognition. Here, the language model is adjusted for better keyword spotting performance during the keyword search by adapting the language on the basis of the keywords to be searched. This will be described in more details below.

At step 720, the audio data is processed with the adapted language model to determine if the audio data contains occurrences of the keywords therein. Finally at step 725, data is released at an output of the processing entity 105 conveying the results of the processing of the recording with the adapted language model. The output of processing entity 105 may be any suitable output including and the data output may be in any suitable form. For example, a visual indicator may be output to a viewable display or a list or file may be output to a recording medium.

Adapting the language model serves to tailor the speech recognition process achieve higher detection performance for the keywords during the subsequent search. Any suitable way to adapt the language model may be used. We may begin with a generic language model that is not adapted on the basis of the keywords. By "generic", it is not meant that the generic language model is not tailored to the application, context, and/or field in which it will be used, but rather it is meant that it has not been adapted on the basis of the keywords to be searched. For example, if the system is to be used in the context of energy trading, a generic language model may exist that will be shared for all searches that the system may be called upon to perform. This generic language model may be generated using transcripts of conversations related to energy trading such that the generic language model is suited for speech recognition in the energy trading context. The person skilled in the art will appreciate that training a language model can be done using a large quantity of transcribed audio. As will also be appreciated by the person skilled in the art, the more transcribed audio is available, the better the training that can be performed. With larger amounts of training material, n-gram language models may be trained for higher levels of n. In experimental trials, it was found that with between 5 and 50 hours of audio conversations pertaining to energy trading unigram and bigram language models could be trained.

As mentioned above, the generic language model may be trained for repeated use in a particular setting. Alternatively, a generic language model may be trained particularly for a given search. If no pre-transcribed audio is available, this may involve manually transcribing several hours of audio as training material. However, depending on the volume of recordings to be searched, this overhead effort may be worthwhile.

Alternatively still, the generic language model may not be tailored to the specific context for which it is intended to be used. Instead, the generic language model may be based on non-field-specific training. For example, the generic language model may be trained from news broadcast audio, or similarly general-topic audio. However in experimental results, generic language models based on non-context-specific training fared considerably less well than in-context trained language models The generic language model is adapted on the basis of the keywords to be searched. The keywords to be searched may be unconventional words and may be absent from the language model. As such, these words may first have to be added to the language model. In one example of adaptation of the generic language on the basis of the keywords, the likelihoods of the keywords may be boosted in the language model. This is performed in the present example and will be further discussed below.

As will be appreciated, the system 100 may be re-usable. The system 100 may be used for searching purposes several times for separate, unrelated searches. For these separate searches, if the context remains the same, a same generic language model may be used at each occasion, but the adaptation of the language model will vary. For example a large energy company may employ the system 100 at several occasions to perform keyword searches of telephone recordings in the context of energy trading. At each of these occasions, the search may be completely unrelated to previous and/or future searches, and thus the searches may involve completely different keywords. The context, on the other hand, may be the same, since the telephonic records are all related to energy trading. Separate searches may aim to identify completely different recordings. For example, a first search may aim to identify energy trading calls related to Company A while later the system 100 may be used for a second search that aims to identify energy trading calls related to Company B. For the two searches, different keywords will likely be used. For example, the first search may have as keywords the name of Company A and the names of several key employees of Company A while the second search may have as keywords the name of Company B and the names of several key employees of Company B.

The reusability of the system will now be described in more details. For illustrative purposes, the example described above with reference to FIG. 7 will now be assumed to have been a first search performed by the system 100 (using first keywords), and we will assume that the system 100 is called upon to perform a second search using second keywords.

To perform a second search, data conveying second keywords is input in the processing entity 105, for example from the administrator interface 110 via the data link 111. This can be done in a manner similar to the manner of inputting the data conveying first set of keywords described in relation to step 710, above. For this example, it will be assumed that there are several second keywords to use in the search, although one will appreciate that a search can be performed using a single keyword if there is only one keyword to be searched.

In the first search, there was an optional step involving receiving an indication of the audio data to be searched. In the second search, there is such an optional step as well.

The first search may have been performed on a first set of audio data, such as a first set of recordings identified as described with reference to step 215 in FIG. 2, above. The second search will be performed on a second set of audio data, which may or may not be the same audio data as that on which the first search was performed. The audio data to be searched may be vary on a per-search basis. For example, if the first search aimed to identify certain 2008 recordings, it is likely that the first search was only performed on audio data dating from 2008. If the second search aims to identify certain 2009 recordings, it is likely that the second search will be performed only on audio data dating from 2009 and will therefore not be performed on the same audio data as the first search was. On the other hand if both the first and the second search searched through all the available audio data (and if the available audio data has not changed since the first search) then the first set of audio data (that is, all the available audio data) will be the same as the second set of audio data. In other examples, the first and second sets of audio data may have some partial overlap.

Returning to the second search, once the data conveying second keywords is received, the software may then process the data conveying the second keywords to adapt the generic language model to the keywords and generate a second adapted language model. As mentioned above, the second search may relate to the same context as the first search did. As such, the generic language used in the second search may be the same as the one used in the first search. However, while the generic language model was adapted in the first search to the first keywords, the generic language model is now adapted to the second keywords for the purposes of the second search. The result is a second adapted language model that is adapted to the second keywords. Adapting the generic language model to the second keywords may be done in any suitable manner such as by boosting the likelihoods of the second keywords in the manner described herein.

Finally, the second set of audio data is processed with the second adapted language model to determine if the second set of audio data contains occurrences of the second keywords therein.

Data is then released at an output of the processing entity 105 conveying the results of the processing of the recording with the second adapted language model.

When multiple searches are performed as described above, data is released at the output of the processing entity conveying the results related to the searches. In this example, data is released conveying the results of the processing of the first and second sets of audio data with the language models adapted to the first and second keywords respectively. This needs not be done at one single time. In fact, in the present example, the data conveying the results of the processing of the first set of audio data with the language models adapted to the first keywords are released upon completion of the first search while the data conveying the results of the processing of the second set of audio data with the language models adapted to the second keywords are released thereafter upon completion of the second search. Alternatively, results for both searches may be released together, for example if the results of all searches performed in a given time period are required together.

Depending on the capabilities of the system 100, multiple unrelated searches may be performed simultaneously in parallel. In such a case, the same principles as described above would apply even though the second search may not necessarily be subsequent to the first search.

Figure 5:
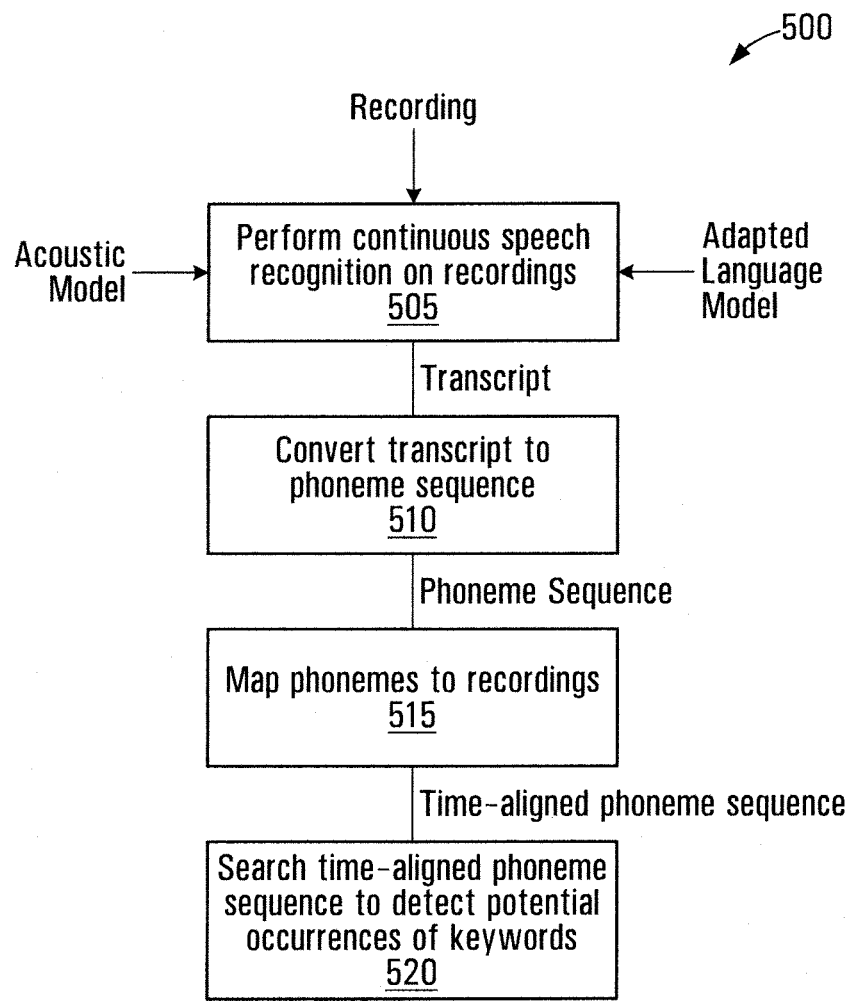
FIG. 5 shows a flow chart of a method for searching for keywords in audio data according to another non-limiting embodiment.

FIG. 5 illustrates the steps of keyword detection method according to a first embodiment.

Speech recognition is used to generate a phoneme sequence, as described below, in which the phonemes of keywords will be searched.

At step 505, the processing entity 105 performs continuous speech recognition on the recording. For the purposes of this example, it will be assumed that the recording comprises a telephone conversation. Continuous speech recognition derives a transcript of the utterances in the recording. The term continuous indicates that speech recognition is performed linearly on an ongoing, stream-like fashion or one portion at a time. The use of continuous speech recognition allows arbitrarily long recordings to be transcribed and also permits real-time transcription. However, in alternate embodiments non-continuous speech recognition may be used if the recordings are of manageable size and real-time processing is not required.

The speech recognizer may be any suitable speech recognizing algorithm but in the present example, the speech recognizer performs a Viterbi search using a beam-width to reduce time and memory requirements for the search. To provide continuous recognition without running out of memory, the speech recognizer outputs the partial word sequence at every set increment of time, such as 5 seconds, and flushes the beam.

The speech recognizer produces a transcript of the recording. At step 510, a text-to-phoneme conversion is then performed on the transcript to derive a first phoneme sequence for the recording. Like the speech recognition performed earlier, the text-to-phoneme conversion may be a continuous process and the entire transcript may not be required to convert a portion thereof. For example, the transcript may be converted segment-by-segment linearly in a single pass such that as audio data is transcribed, it is also continuously converted to a phoneme sequence even as speech recognition is ongoing. The first phoneme sequence comprises the phonemes that are believed to be present in the words of the speech in the recording, based on the speech recognition performed, but not necessarily in the exact time alignment in which they were actually enunciated.

The first phoneme sequence is then mapped to the recording to obtain a time-aligned phoneme sequence. This is represented by step 515. By mapping the first phoneme sequence to the recording, it is meant that the phonemes in the first phoneme sequence are repositioned chronologically to reflect the timing they are found to have in the recording. In the example shown here, this is done through Viterbi alignment, although any suitable algorithm may be used. The mapping step may also be performed continuously such that the phonemes in the phoneme sequence provided by the text-to-phoneme conversion step 510 are aligned even as the sequence is being provided. The resulting phoneme sequence is said to be time-aligned because the phonemes it contains are chronologically aligned with the phonemes that were actually enunciated in the speech in the recording.

It will be appreciated that in order to search through a plurality of recordings, it is necessary to perform the above-described process for each of the plurality of recordings to derive a time-aligned phoneme sequence for each of the recordings.

Every time-aligned phoneme sequence is searched for occurrences of keywords individually. The procedure for such search of a time-aligned phoneme sequence of one recording will now be described.

At step 520, the resulting time-aligned phoneme sequence can now be searched for the keyword phoneme sequences corresponding to the keywords. Any suitable search algorithm may be used. In the present example, a confusion matrix based algorithm is used, which will now be described. Let the keyword KW1 correspond to a keyword phoneme sequence defined as $q=\{q_1, q_2, \ldots, q_n\}$ where each $q_i$ represents a phoneme. It will be appreciated that the keyword phoneme sequence of KW1 comprise n phonemes. The time-aligned phoneme sequence corresponding to the recording being searched for keywords will likely comprise many more phonemes than the keyword KW1 being search. For the purposes of this example, the time-aligned phoneme sequence will be described as $h=\{h_1, h_2, \ldots, h_m\}$ where m is the number of phonemes in the time-aligned phoneme sequence. In order to achieve the highest likelihood of detecting an instance of a keyword in the recording, every consecutive sequence of n phonemes in h ($h_1$-$h_n$, $h_2$-$h_{n+1}$, ..., $h_{m-n+1}$-$h_m$) may be compared to the keyword phoneme sequence. However, it is possible to compare only a subset of all these consecutive sequences of n phonemes to the keyword phoneme sequence without departing from the intended scope of the present invention. Skipping sequences may reduce computational burden but may lead to sub-optimal results.

A confusion matrix $P(p_i|p_j)$ is computed in advance from a speech corpus and a threshold T is computed as follows:

$$T=\Sigma_{i=1}^{n}P(h_i|q_i)/\Sigma_{i=1}^{n}P(q_i|q_i) \qquad [1]$$

The right hand side of equation [1] provides a hypothesis score, that is, a measurement of the confidence that KW1 was detected at the segment of the recording corresponding to $h_1$-$h_n$. T is used as a threshold for pruning hypotheses. By adjusting T, it is possible to adjust the keyword spotting threshold, which can be used to control the percentage of keyword recall and the number of false alarms. The percent recall and false alarms per minute rate are given as follows:

percent recall=((total true occurrences)*100)/(total true positives)     [2]

false alarms/minute=(total false alarms)/(total test duration in mins)     [3]

Equation [1] is used to identify potential keyword occurrences in the recording. However, it should be appreciated that other mechanisms for identifying potential keyword occurrences may be used. Moreover, it should be understood that additional considerations may come to play when detecting potential keyword occurrences.

In particular, it was mentioned above that overlap may occur if a single keyword is detected multiple times for a given occurrence. There may be repeated proximate instances of keyword detection using equation [1] when a same is detected from multiple starting points. To avoid registering multiple overlapping potential occurrences of the keyword, if multiple detections occur within a certain minimum proximity threshold, all but one detected potential occurrence may be eliminated. This can be done for example by discarding all detection within the minimum proximity threshold time period except the one that exhibited the highest detection confidence. In a particular example, if the same keyword occurs more than once within 0.5 seconds, then only the highest scoring hypothesis is kept.

It will be appreciated that the value selected for T affects the percentage of keyword recall and the number of false alarms.

As will be familiar to a person skilled in the art, the speech recognizer employs a language model to generate the transcription of the uttered terms in the recording. The language model used here is a language model for which the key words have been boosted. By boosting it is meant that the likelihood of the keywords in the language model are increased by a given factor. It will be appreciated that increasing the likelihood of a keyword in a language model makes detection (whether correct or not) much more likely.

In experiments performed, it was found that boosting the likelihood of the keywords improved the recall rate dramatically. The improvement resulting from "boosting" the language model was far beyond expectations. By boosting the keyword likelihoods in the language model, the likelihood of keywords matching the acoustics increased. As was discovered in experimentation, a boosting the likelihood of the keywords by a certain factor creates new keyword matches that largely correspond to true occurrences of the keywords (true positives). The number of false alarms (false positives) also increases with the boosting of keywords in the language model, however, it was discovered that the rate of true positives increases much more than the rate of false positives with moderate boosting. Thanks to this surprising fact, boosting likelihoods of keywords resulted in a great improvement of performance. Experimentation leading to this discovery is disclosed in U.S. Provisional Application No. 61/144,243, which is incorporated herein by reference.

Figure 6:
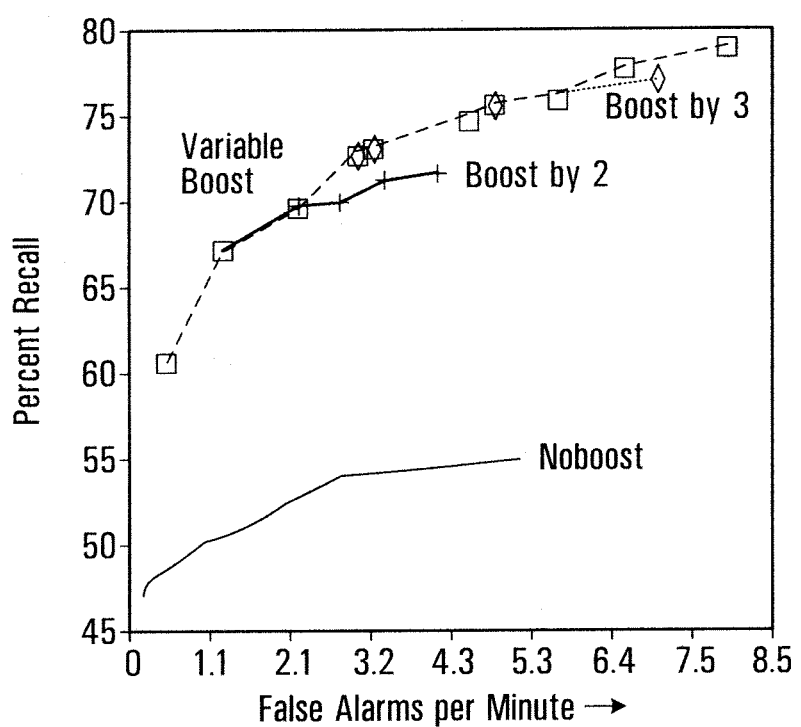
FIG. 6 shows a plot of false percent recall and false alarms per minute as a threshold is varied according to an experimental tests.

FIG. 6 illustrates the experimental results in a an experimental tests where the vertical axis represents percent recall (that is, the percentage of actual occurrences of keywords detected), the horizontal axis represents the rate of false alarms per minute and the three plotted lines represent the value of percent recall and false alarm rate as T is varied for 1) no boost to key words, 2) a boost by a factor of 2 (double the log-likelihood of keywords), and 3) a boost by a factor of 3 (triple the log-likelihood of keywords).

As can be seen in FIG. 6, the performance increase derived from boosting the language model is significant. Furthermore, the slop of the plot lines show that for low values of T, the percent recall increases much faster than the false alarm rate. Although boosting the language model by a factor of 2 causes a very significant increase in performance over no boosting, boosting the language model by a factor of 3 provides only a mild performance increase. Indeed, it is to be predicted that as the boosting factor increases, so does the false alarm rate. Although the recall rate increases with greater boosting, if the false alarm rate is too high, the advantages of the present system may be diminished as a prohibitively large number of potential occurrences of keywords (many of them false) may be detected, leading to increased operator work time and a decreased advantage over traditional "listen-to-all-the-recordings" approaches. Furthermore, computing and playing back a large number of selected segments of recordings and handling a large number of confirmations/rejections from operators will also increase the computational resources required by the system.

Advantageously, however, by adjusting the threshold value T, and by adjusting the boost factor for the keywords, the system can be adjusted to produce an acceptable amount of false alarms (false positives). The concept of adjusting the threshold value T and the boost factor allows the tradeoff between recall rate and false alarm rate to be controlled to achieve high recall rates without suffering from the unacceptably high false alarm rate that would be entailed by these high recall rates in prior art solutions. Thus it is to be understood that to achieve a certain recall rate and/or false alarm rate, either one or both of T and the boost factor may be adjusted. In the present example the value of T is selected such as to obtain a certain number of hits (detected potential occurrences of keywords) per minute, for example 3.5-4 hits per minute.

It is to be understood that boosting keyword likelihoods can be done with unigram languages models, bigram language models, or any other n-gram language model. In boosting the log-likelihood of every n-gram that contains the keyword is boosted.

Figure 8:
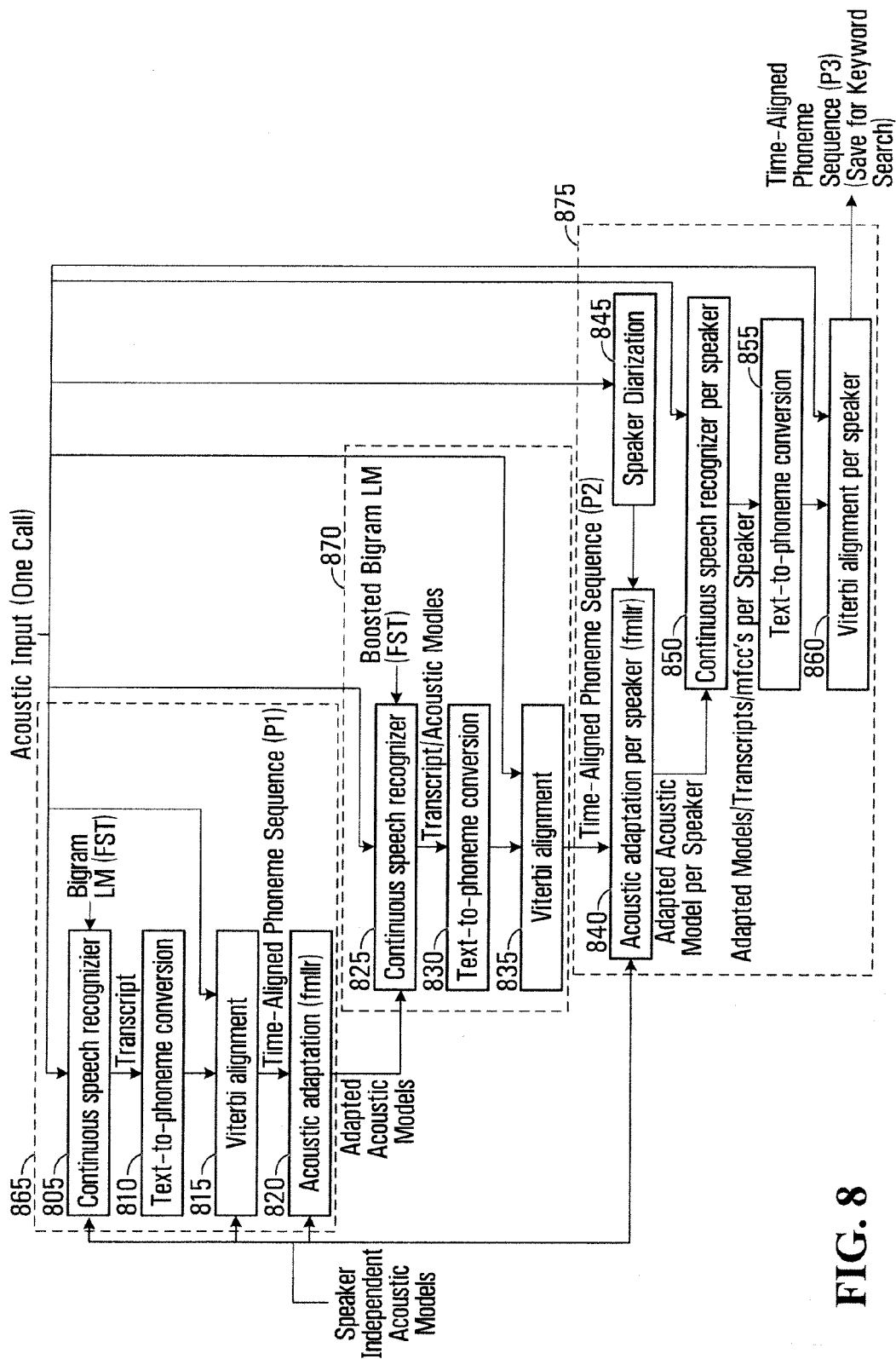
FIG. 8 shows a flow chart of a method for generating a time-aligned phoneme sequence according to a non-limiting embodiment.

FIG. 8, illustrates the general steps involved in a method for searching for audio keywords in a plurality of recordings according to a second embodiment In order to achieve a still higher recall rate for keywords, it is possible to generate an adapted acoustic model for the particular recording. The steps involved in generating an adapted acoustic model are depicted in FIG. 8. More specifically the steps involved are shown as a group as first stage 865. The steps involved in the first stage 865 resemble the steps of the first embodiment described above with a few differences. They will now be described.

In a first step, 805, a continuous speech recognizer performs continuous speech recognition on the recording. The continuous speech recognizer uses a speaker-independent acoustic models and a generic language model. The generic language model may be an n-gram model for any n, and in present example, it is a bigram Language model. The speech recognizer outputs a transcript of the recording and at step 810, the transcript is converted to an initial phoneme sequence. At step 815, the phoneme sequence is mapped to the recording to obtain an initial time-aligned phoneme sequence. As before, this may be done through Viterbi alignment. The resulting time-aligned phoneme sequence (P1) may not be as precise as that resulting from the first embodiment described above, and it is not used here for searching keywords but rather for generating adapted acoustic models. Nonetheless, a person skilled in the art would understand that a keyword search as described above could be performed on the bases of the time-aligned phoneme sequence (P1).

At step 820, an adapted acoustic model is generated. The adapted acoustic model is adapted based on features in the acoustic input and may be adapted to the line condition and the speaker in the call. A linear transform of the feature parameters is computed on the basis of the initial time-aligned phoneme sequence. More specifically, acoustic adaptation using an fMLLR (or constrained MLLR) adaptation is performed. We now have adapted acoustic models that can be used in a second stage 870 of the embodiment.

In the second stage 870, a continuous speech recognizer performs speech recognition on the basis of the adapted acoustic models derived in the first stage 865.

First, at step 825, the speech recognizer uses the adapted acoustic models and a second language model to generate a transcript of the recording. The second language model may be adapted on the basis of the keywords to be searched and in the present example, the second language model is boosted as described above. The transcript generated by the speech recognizer is then converted to a second phoneme sequence at step 830. At step 835 the result of this conversion and the adapted acoustic model is used to perform Viterbi alignment to map the phonemes to the recording. The result is a second time-aligned phoneme sequence (P2).

Thus at the first stage 865, an adapted acoustic model is created using the recording itself. This adapted acoustic model is better suited for use by the speech recognizer and in Viterbi alignment such that the when the adapted acoustic model is used in the second stage 870, the result is a second time-aligned phoneme sequence (P2) that may be more precise than the first time-aligned phoneme sequence. The second time-aligned phoneme sequence (P2) may be used for the purpose of a keyword search as described above, which in turn may lead to better results in keyword detection than if the first time-aligned phoneme sequence (P1) was used. The addition of a third stage 875 is not necessary and may be computationally burdensome but may provide an even better time-aligned phoneme sequence that will yield still superior search results.

In the illustrated example, however, a third stage 875 is present to even further improve performance. The second time-aligned phoneme sequence is further enhanced by performing acoustic adaptation in accordance with each speaker in the recording. The process is similar to that described in respect of the second stage 870. Speaker diarization is performed at step 845 on the recording to segment the recording according to the different speakers. Acoustic adaptation is then performed at step 840 on a per-speaker basis to provide per-speaker adapted acoustic models. These are then used by a continuous speech recognizer along with a third language model to generate a transcript of the recording. The third language model may be adapted on the basis of the keywords to be searched and may be the same as the second language model described above. The result is text-to-phoneme converted at steps 855, and the per-speaker adapted acoustic models and phoneme sequences are mapped at step 860 to the recording using Viterbi alignment per speaker to create a third time-aligned phoneme sequence which may be even more precise than the second time-aligned phoneme sequence. The third time-aligned phoneme sequence may thus lead to even better results in keyword detection.

It will be appreciated that any one of the time-aligned phoneme sequences P1, P2 and P3 may be used to perform a keyword search as described herein and that it is not necessary to perform all three stages 865, 870 and 875 and that certain stages may be omitted, for example to reduce computational burden on the processing entity 105. For example, the third stage 870 may be omitted to reduce computational burden.

Keyword searching as described herein may be performed as fast as the audio data's playback speed, given sufficient computing power. To increase the speed at which keyword searching is performed, the processing entity 105 may be provided with greater processing power.

The individual steps involved in search such as speech recognition, text-to-phoneme conversion and mapping may be performed sequentially. Alternatively, it may also be desired to perform as much of the work involved in keyword searching as possible in parallel. The resulting co-temporal occurrence of the steps involved may reduce the overall time of keyword recognition by avoiding the overhead of waiting for the previous step to complete at every step. It may also be possible to perform a keyword search in real-time, with a small delay that may be controllable.

The speed of computing the search will be a factor in whether a search can be performed in real-time. A person skilled in the art will appreciate that the use of continuous speech recognition, text-to-phoneme conversion and mapping allows the continuous generation of a time-aligned phoneme sequence without requiring each successive step to wait until the previous one has finished being applied to an entire extend of the audio data. This may be done by providing the output of each step to the next step at fixed time intervals, such as every few seconds. If each step is performed sufficiently fast and the overall process is performed sufficiently fast, the result will be a real-time keyword recognition with a few seconds of delay. The delay may be controllable, for example by adjusting the intervals at which each step releases output.

A person skilled in the art will also appreciate that if each step in the keyword search is continuous as described above, and performed sufficiently fast such that the overall process is quicker than the speed at which an audio data stream is received, then keyword searching may be performed continuously on an input stream of data. As such, the keyword searching described herein may be used to monitor ongoing speech, such as an ongoing telephone conversation.

The searching described herein may therefore be used in applications for monitoring of ongoing telephone conversation. For example, a keyword search system may be used in a call center for training and/or quality of service purposes. The multiple calls going on in the call center may be monitored simultaneously if sufficient processing power is available to do so, or certain ongoing calls may be selected, for example at random, for monitoring according to the available processing power. The potential occurrence of a certain keyword in the conversation of a monitored call may be identified by a keyword search being performed continuously in real-time on the ongoing call. Here, however, instead of generating location data and selecting a subset of audio data to play to an operator, the operator is merely alerted to the fact that a certain keyword has potentially occurred in the conversation. The operator may then choose to listen in on the call and/or to record it. This may be done, for example, for training purposes or for quality assurance purposes.

Alternatively, the call in which a keyword has potentially occurred may be automatically recorded or flagged by generating a label without input from an operator. If the calls in the call center are already being recorded and stored, a label for the recording may be created as described above in connection with step 245 of FIG. 2. If the calls are not already being recorded, the remainder of the call may be recorded and stored after a potential occurrence of a keyword is detected. In another option, all calls may be stored temporarily only for a short duration and may be stored more permanently only if they are found to contain a potential occurrence of a keyword. Their storage address in a longer-term storage location may serve as label indicating that they contain a potential occurrence of a keyword, or a label may be provided in another manner.

Although this example was described here in the context of a call center, a person skilled in the art will understand that there are many potential applications for live keyword searching, including security applications.

Although the processing power of the processing entity 105 may be increased to increase the speed of the detection, an alternative is to reduce the computational demand of the search itself. This option may have the effect of reducing the accuracy of the search results. For example, one option is to select fewer keywords to search for, however this may result in pertinent calls being missed. Another option is employ a less computationally-intensive speech recognizer, however this may lead to less accurate transcripts and therefore to less reliable detection. As mentioned earlier, in the search for a keyword's phoneme sequence in the audio data's phoneme sequence may not take into account every possible position of the keyword's phoneme sequence to reduce computational burden, although this may lead to a reduced number of potential detections. These are merely examples of how to reduce the computational burden of keyword searching. A person skilled in the art will readily appreciate that there are many manners in which computational burden may be reduced. In particular, a person skilled in the art will understand that there are many ways in which a tradeoff between search performance and speed can be achieve in order to suit the search to particular demands.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method of identifying occurrences of a keyword within audio data, the method comprising:
    a) providing a computer based processing entity programmed with software, the software implementing a language model to perform speech recognition;
    b) inputting in the processing entity data conveying the keyword;
    c) processing the data conveying the keyword with the software to adapt the language model to the keyword and generate an adapted language model, wherein processing the data conveying the keyword with the software to adapt the language model to the keyword comprises increasing a likelihood of the keyword in the language model;
    d) processing the audio data with the adapted language model to determine if the audio data contains the keyword;
    e) releasing result data at an output of the processing entity conveying results of the processing of the audio data with the adapted language model.

2. The method of claim 1, wherein increasing the likelihood of the keyword in the language model comprises boosting a log-likelihood of every n-gram that contains the keyword.

3. The method of claim 1, further comprising prior to increasing the likelihood of the keyword in the language model, adding the keyword to the language model.

4. The method of claim 1, wherein processing the audio data with the adapted language model comprises performing speech recognition on the audio data using the adapted language model to derive a transcript of the audio data.

5. The method of claim 4, wherein the speech recognition is continuous speech recognition.

6. The method of claim 4, wherein processing the audio data with the adapted language model further comprises performing a text-to-phoneme conversion on the transcript to derive a first phoneme sequence.

7. The method of claim 6, wherein the text-to-phoneme conversion is performed continuously.

8. The method of claim 6, wherein processing the audio data with the adapted language model further comprises mapping the phonemes in the first phoneme sequence to the audio data to derive a time-aligned phoneme sequence.

9. The method of claim 8, wherein mapping the phonemes in the first phoneme sequence to the audio data is performed continuously.

10. The method of claim 8, wherein processing the audio data with the adapted language model further comprises searching the time-aligned phoneme sequence for occurrences of a keyword phoneme sequence corresponding to the keyword.

11. The method of claim 10, wherein searching the time-aligned phoneme sequence for occurrences of a keyword phoneme sequence comprises computing a confusion matrix.

12. The method of claim 10, wherein the speech recognition is performed using a speaker-independent acoustic model.

13. The method of claim 10, wherein speech recognition is performed using an adapted acoustic model derived from an initial time-aligned phoneme sequence.

14. The method of claim 13, wherein the transcript of the audio data; is a second transcript, the method further comprising:
    a) performing speech recognition on the audio data using a speaker-independent acoustic model to derive an initial transcript of the audio data;
    b) performing a text-to-phoneme conversion on the initial transcript of the audio data; to derive an initial phoneme sequence;
    c) mapping the phonemes in the initial phoneme sequence to the audio data to derive an initial time-aligned phoneme sequence; and
    d) generating the adapted acoustic model on the basis of the initial time-aligned phoneme sequence and the speaker-independent acoustic model.

15. The method of claim 14, wherein the adapted acoustic model is generated using feature-based maximum likelihood linear regression (fMLLR).

16. The method of claim 10, further comprising performing speaker diarization on the audio data to identify segments of the audio data corresponding to individual speakers;
    wherein the transcript of the audio data is a per-speaker transcript of the audio data derived by performing speech recognition using a per-speaker adapted acoustic model and an indication of the segments of the recording corresponding to individual speakers.

17. The method of claim 1, further comprising inputting in the processing entity a signal indicative of the audio data.

18. The method of claim 17, wherein the audio data comprises at least one recording, wherein the signal indicative of the audio data identifies the at least one recording from among a collection of recordings.

19. A method of identifying occurrences of keywords within audio recordings containing speech information, the method comprising:
    a) providing a computer based processing entity programmed with software, the software implementing a language model to perform speech recognition;
    b) inputting in the processing entity first data conveying a first keyword;
    c) processing the first data with the software to adapt the language model to the first keyword and generate a language model adapted to the first keyword, wherein processing the first data with the software to adapt the language model to the first keyword comprises increasing a likelihood of the first keyword in the language model;
d) processing a first set of recordings with the language model adapted to the first keyword to determine if the first set of recordings contains the first keyword;
e) inputting in the processing entity second data conveying a second keyword;
f) processing the second data with the software to adapt the language model to the second keyword and generate a language model adapted to the second keyword, wherein processing the second data with the software to adapt the language model to the second keyword comprises increasing the likelihood of the second keyword in the language model;
g) processing a second set of recordings with the language model adapted to the second keyword to determine if the second set of recordings contains the second keyword; releasing data at an output of the processing entity conveying results of the processing of the first and second sets of recordings with the language models adapted to the first and second keywords, respectively.

20. A method of identifying occurrences of a keyword within audio data, the method comprising:
a) providing a computer based processing entity programmed with software, the software implementing a language model to perform speech recognition;
b) performing speech recognition on the audio data using a speaker-independent acoustic model to derive a first transcript of the audio data;
c) performing a text-to-phoneme conversion on the first transcript of the recording to derive a first phoneme sequence;
d) mapping the phonemes in the first phoneme sequence to the audio data to derive a first time-aligned phoneme sequence; and
e) generating an adapted acoustic model on the basis of the first time-aligned phoneme sequence and the speaker-independent acoustic model;
f) inputting in the processing entity data conveying the keyword;
g) processing the data conveying the keyword with the software to adapt the language model to the keyword and generate an adapted language model;
h) processing the audio data with the adapted language model to determine if the audio data contains the keyword;
i) wherein processing the audio data with the adapted language model comprises:
performing speech recognition on the audio data using the adapted language model to derive a second transcript of the audio data, wherein speech recognition is performed using the adapted acoustic model;
performing a text-to-phoneme conversion on the second transcript to derive a second phoneme sequence;
mapping the phonemes in the second phoneme sequence to the audio data to derive a second time-aligned phoneme sequence;
searching the second time-aligned phoneme sequence for occurrences of a keyword phoneme sequence corresponding to the keyword;
j) releasing result data at an output of the processing entity conveying results of the processing of the audio data with the adapted language model.

21. The method of claim 20, wherein the adapted acoustic model is generated using feature-based maximum likelihood linear regression (fMLLR).

* * * * *